United States Patent [19]

Lingl

[11] 4,083,275

[45] Apr. 11, 1978

[54] METHOD AND APPARATUS FOR THE SPREADING AND TRANSFERRING OF ROWS OF BRICK-LIKE ARTICLES

[75] Inventor: Hans Lingl, Neu-Ulm-Ludwigsfeld, Germany

[73] Assignee: Lingl Corporation, Paris, Tenn.

[21] Appl. No.: 674,276

[22] Filed: Apr. 6, 1976

[30] Foreign Application Priority Data

Jul. 22, 1975 Germany .............................. 2532695

[51] Int. Cl.² .............................................. B26D 7/06
[52] U.S. Cl. .......................................... 83/27; 83/102;
83/408; 198/809; 198/458
[58] Field of Search ........................... 83/102, 408, 27;
198/809, 458

[56] References Cited

U.S. PATENT DOCUMENTS 2,180,075  11/1939  Stout ..................................... 198/458
3,478,397  11/1969  Pearne et al. ......................... 83/408
3,487,954   1/1970  Pearne et al. ......................... 83/102

Primary Examiner—Donald R. Schran
Attorney, Agent, or Firm—Cushman, Darby & Cushman

[57] ABSTRACT

A device and method for spreading apart and transferring rows of block-like articles such as bricks which have previously been cut including an exemplary apparatus comprising a roller table for receiving the row of blocks from the cutting area and a separating device designed to be raised between the rollers in the roller table for spreading the blocks apart in a predetermined manner, prior to transfer of the blocks onto a pallet. The invention accomplishes the separating and transfer of the items being handled, while such items continue to move in the machine direction, thereby increasing the per unit processing capacity while also reducing the space requirements of such machines.

6 Claims, 5 Drawing Figures

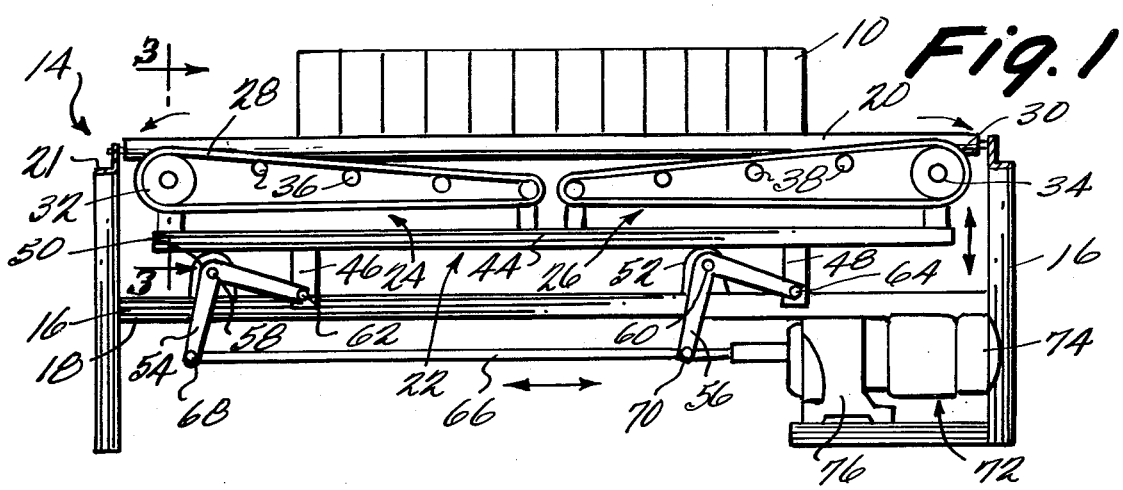
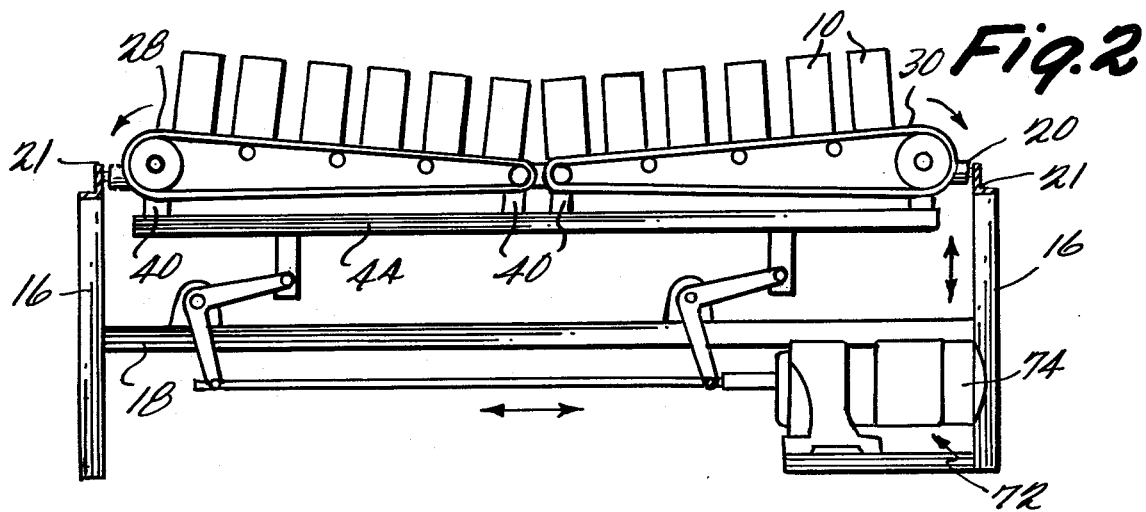
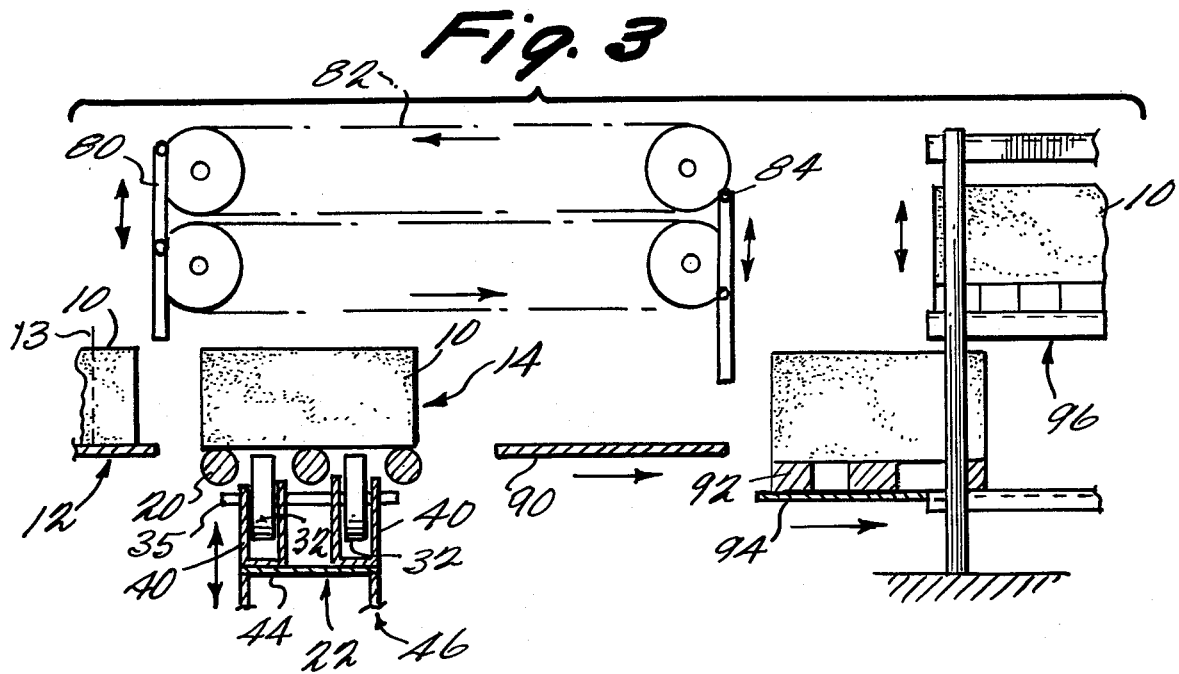

METHOD AND APPARATUS FOR THE SPREADING AND TRANSFERRING OF ROWS OF BRICK-LIKE ARTICLES

BACKGROUND OF THE INVENTION

The present invention relates generally to a device and method for spreading apart and transferring rows of block-like articles such as bricks, blocks or split tiles from the cutting area to an accumulator.

Some brick and/or brick-like manufacturing processes move the newly cut bricks directly to an area where they are grouped, lifted, spread apart and stacked in a hack on a kiln car while other processes first transfer each row of newly cut bricks to a pallet in a spaced-apart condition for drying and/or other processing prior to hacking and firing. This invention is concerned with an improvement in the latter general type of process. It may also find use in analogous manufacturing processes for other brick-like articles made from clay such as tile, blocks, etc.

In such processes, spreading is usually required following the cutting of bricks, since the bricks would then still be essentially in an abutting relationship or at least not properly spaced for drying purposes. For example, the bricks may be cut by pushing an extruded section of clay column laterally through a set of vertical wire cutters.

The present invention produces fixed or variable spacing as desired in a manner which not only increases the capacity of the process, but which also reduces the space requirements for associated machinery.

It is known that the spreading apart of block-like items, such as bricks, can be accomplished if the entire row of blocks is transported transversely to the lateral direction in which the row of bricks had been moving through the wire cutters. This, however, requires that the apparatus be wider, at least at some point, than the length of the row of bricks and requires additional time-consuming processing steps.

It is also now well known that the cutting of extruded column sections of clay material into individual bricks can be accomplished by moving the extruded column pieces sideways or laterally through a wire cutter with the wires being spaced in a predetermined pattern so as to produce bricks of a desired size. The lateral direction of movement of that column can be termed the "machine direction" for the purposes of the present discussion.

After the cutting operation, the bricks have in the past been moved transversely or in a cross-machine direction by a first conveyor away from the cutting area and deposited onto a second faster moving conveyor. By combining such transverse movement with the transfer of bricks to the second faster moving conveyor, proper spacing between bricks has been obtained. However, while the individual bricks will have thus become spaced from adjacent bricks in a lateral direction, the entire group or row of bricks has been moved away from the machine direction. As will be appreciated, deviations in the flow of bricks out of or away from continuous movement in the machine direction lengthens processing time. Further, the additional apparatus to accomplish such spacing requires the use of greater amounts of floor space.

The previously known types of apparatus as just discussed have usually been of considerable length, and the articles or bricks have been transported at relatively high velocities. Such high velocities often cause machinery malfunctions or damage the newly-formed but yet undried bricks.

The present invention accomplishes both the transfer of the newly-formed undried blocks or bricks to an accumulator and the desired separation or spacing of those undried blocks in a faster, less complex manner than heretofore. Further, this spacing is accomplished without the need for transporting the blocks in a cross-machine direction away from the area of cutting and out of the path of the machine direction. The apparatus, according to the present invention, is also more compact which reduces the space required for such machinery and also allows the processing speed to be increased.

BRIEF DESCRIPTION OF THE INVENTION

The present invention contemplates both a method and apparatus in which the blocks or bricks are preferably fed from the cutting apparatus directly onto a roller table with the blocks still in an abutting relationship with each other. A spreading assembly comprised of a set of inclined conveyors or other inclined lateral transport mechanism is positioned so as to lie between the rollers on the roller table and is designed so as to be vertically movable between an inoperative position and an operative spacing or separating position. For convenience, the generic lateral transport mechanism will be hereafter referred to as conveyors since that is the specific type of mechanism employed in one of the presently preferred exemplary embodiments discussed below. Preferably, when the conveyors are in their operative separating position, they move laterally (cross-machine direction) on an incline such that the ends of the conveyors adjacent the edges of the roller table are at a higher elevation than the portion of the conveyors located at the center of the roller table. As the conveyors are being raised from their inoperative position into the operative separating position, the conveyor belts are driven in a fixed or variable timed relationship to the vertical movement thereof or vice versa so that desired fixed or variable brick spacing is achieved as the conveyors are raised from below the surface of the rollers to successively contact and move outwardly the bricks. The outer blocks or bricks at each end of the row are contacted first by the conveyor belts and moved outwardly as the conveyors are being raised. Thereafter, each of the individual bricks is likewise successively contacted (in a direction from exterior to interior) and moved outwardly. If the conveyor belt speed and upward movement speed thereof are constant, then the resulting spacing will be uniform or linear. On the other hand, if the conveyor speed and/or upward movement speed is varied during the spacing process, then the resulting spacing will be similarly varied from one article to the next as will be appreciated; such variable spacing is sometimes desired in brick manufacturing.

When the conveyors are in their operative separating position, movement of the conveyor belts is stopped and the conveyors can thereafter be lowered to their inoperative position, which again places the bricks or blocks on the roller table but now properly spaced as desired.

Subsequently, the bricks can be moved onto suitable support means which then, in turn, transfers the row of blocks to a pallet and finally to an accumulator with the blocks still being in their spaced relationship.

Thus, the present invention not only correctly separates cut undried bricks, but also supplies bricks to an accumulator in a spaced condition without the necessity of moving the whole row of bricks laterally out of the machine direction along which the bricks have been cut.

A more complete and detailed understanding of this invention may be obtained by carefully studying the following detailed description in combination with the drawings of which:

FIG. 1 shows a front elevational view of a first exemplary apparatus for practicing the present invention with the spreading or spacing device in its inoperative lowered position and the articles abutting each other;

FIG. 2 is a front elevational view of the exemplary embodiment shown in FIG. 1 where the spreading device is in a raised operative position;

FIG. 3 is a diagrammatic cross-sectional view of the exemplary apparatus shown in FIGS. 1 and 2;

Figure 4:
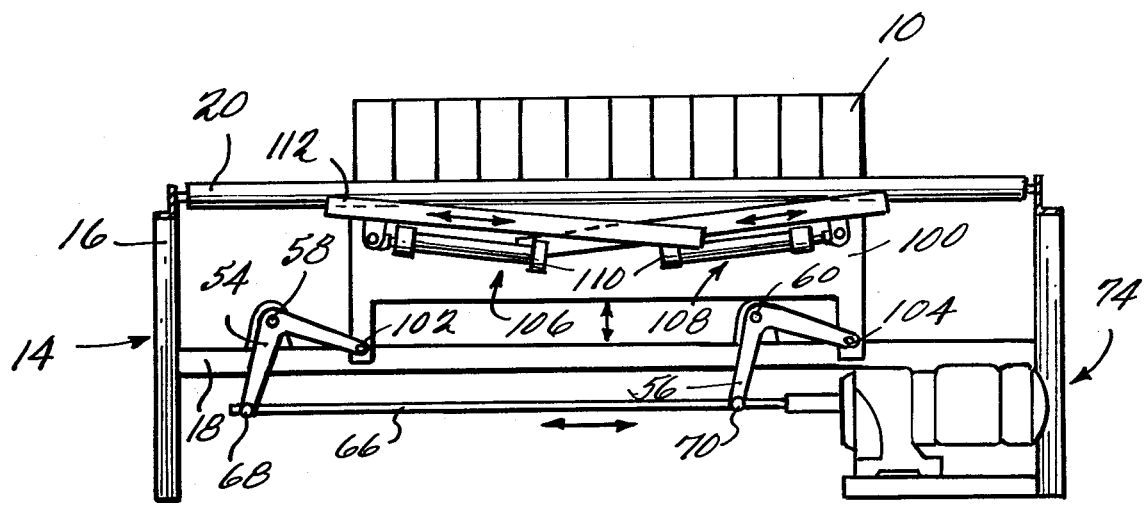
FIG. 4 is a front elevational view of an alternative exemplary embodiment of apparatus for practicing this invention with the spreading device in its lowered inoperative position.

Turning first to FIGS. 1 and 3, the bricks 10 emerge from a cutting area, generally indicated at 12, which includes cutter wires 13, onto a roller table assembly, generally indicated at 14 in FIG. 1. The roller table 14 is comprised of a plurality of vertical supports or legs 16, horizontal support members 18 and rollers 20. The rollers 20 can, for example, be rotatably supported on legs 16 by brackets 21 or any other suitable support device that will allow the rollers 20 to turn freely. As is shown in FIG. 3, the rollers 20 are spaced apart so that the bricks 10 can be supported thereby and also to allow the spreading assembly, generally referred to at 22, to fit therebetween.

In one embodiment, as shown in FIGS. 1-3, the spreading assembly 22 comprises at least two separating conveyor assemblies 24 and 26, each having upper transport surfaces inclined upwardly and outwardly so as to successively engage the overlying bricks as each assembly is moved upwardly. The separating conveyor assemblies 24 and 26 may each be comprised, for example, of a pair of conveyor belts 28 and 30, respectively, which in turn are each respectively driven by pairs of rolls 32 and 34. Each pair of drive rolls 32 and 34 are preferably joined to a common drive shaft, as is shown at 35, so that each conveyor belt in the pair will be driven at identical speeds. Any suitable means such as a variable speed electric motor (not shown) can be used to drive the drive rolls 32 and 34. In addition, suitable roller supports 36 and 38 are located along the length of each conveyor belt 28 and 30, respectively, so as to provide suitable support therealong. As is shown in FIG. 3, each roll 32 is supported by a generally U-shaped bracket 40 which also rotatably supports the drive shaft 35. The U-shaped brackets 40 are secured as by welding or by any other suitable means to a support member 44. Depending from the support member 44 are drive lugs 46 and 48, which are rigidly secured to support member 44 as by welding or any other convenient means. The support member 44 when in lower position, as is best shown in FIG. 1, rests on, and is supported by, blocks 50 and 52, which in turn are secured to the horizontal support bar 18 of the roller table 14.

A pair of inclined transverse transport mechanisms such as conveyors 28, 30 is preferred because it leaves the spread apart row of bricks centered along the machine direction; however, it is noted that a single inclined transverse transport mechanism running the entire row length could also be used although the resulting spaced apart row would be slightly offset from the center of the machine direction as should be appreciated. Further, it is noted that the transverse transport mechanism might be inclined only during the brick separating process such as by raising only one end of it or by raising one end faster than the other end, etc. It is also conceivable that the roller table might be lowered at one end, etc., so as to achieve the desired relative inclination between the roller table support and the transverse transport mechanism such as conveyors 28, 30.

The vertical movement used in raising or lowering the separating assemblies 24 and 26 is accomplished in this exemplary embodiment by angled pivot bars 54 and 56, which respectively are rotatably secured to the blocks 50 and 52 as by pins 58 and 60 and are likewise rotatably secured to the depending drive lugs 46 and 48 as by pins 62 and 64. The pivot bars 54 and 56 are also connected to a drive bar 66 by pins 68 and 70, respectively. The drive bar 66 moves transversely in a cross-machine direction with respect to the direction of brick movement and is drivingly connected to a suitable drive means 72 which can be operated in a forward or reverse mode so as to move the drive bar 66 in the desired direction as will be appreciated.

As is shown in FIG. 1, the row of bricks 10 has been transferred onto the rollers 20 of the roller table 16 but with the bricks still in abutting relationship with respect to each other. As is shown in FIG. 2, when the drive means 72 causes the drive bar 66 to move to the right, the pivot bars 54 and 56 will be rotated in counterclockwise direction, thereby raising the support plate 44 which, in turn, causes the conveyor assemblies 24 and 26 to be raised. The bricks on each end of the row will be contacted first as the conveyor assemblies 24 and 26 begin to move upwardly. At the same time, the conveyor belts on assemblies 24 and 26 are driven in a counterclockwise and clockwise direction, respectively. Thus, the first bricks on each outer end of the row of bricks will be moved upwardly and outwardly by engagement with the moving belts. Further upward movement of the assemblies 24 and 26 will result in similar engagement of the next adjacent bricks on each end of the row, etc. Thus, as the conveyor assemblies 24 and 26 continue to be raised upwardly, each succeeding inner brick in the row continues to be spread apart a desired distance from adjacent bricks and away from the center of the roller table 14 until the position of bricks as shown in FIG. 2 is reached. At that point, the conveyor assemblies 24 and 26 are in their fully raised position and further rotation of drive rollers 32 and 34 is stopped, thus stopping further movement of conveyor belts 28 and 30. With the bricks in the row properly spaced, drive bar 66 is moved outwardly or to the left as shown in FIG. 2, which causes the pivot arms 54 and 56 to move in a clockwise direction, thus reversing the direction of support plate 44 and thereby lowering the conveyor assemblies 24 and 26 back into their normal position, as shown in FIG. 1. The bricks 10 will now be replaced on the rollers 20, but in a fixed or variable spread apart condition as desired.

Following the spreading of the bricks 10 and their replacement on the roller table assembly 14, a pusher plate 80, driven by any convenient means, as for example, a chain drive 82, will be brought into engagement with the row of spaced apart bricks and move the bricks in the machine direction onto a support plate 90. The pusher plate 80 together with a guide plate 84 maintain the alignment of the row of bricks, during their movement to support plate 90.

Following the transfer of the row of bricks 10 from the roller table 14 onto support plate 90, the pusher plate 80 and the support plate 90 move together in the machine direction until the support plate 90 is positioned above and in alignment with a pallet 92 supported on a lift platform 94. The pusher plate 80 is held in its far right position, and the support plate 90 is withdrawn from underneath bricks 10 toward the roller table 14 by any suitable means (not shown) back to its original position, as shown in FIG. 3 where it is again in position to receive a subsequent row of bricks. When the support plate 90 is fully withdrawn, the row of bricks 10 will rest on the pallet 92, as is shown in FIG. 3, and upon retraction of the pusher plate 80, the bricks are in position to be transferred by means of the lift platform 94 to the accumulator, generally indicated at 96.

Turning now to FIG. 4, a second exemplary embodiment of the present invention is set forth, and like numerals show like elements.

Figure 5:
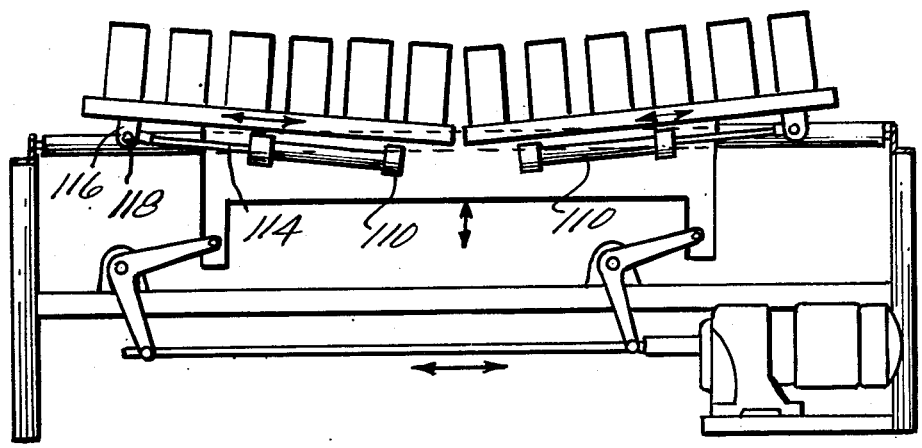
FIG. 5 is a front elevational view of the alternative exemplary embodiment of FIG. 4 showing the spreading device in its raised operative position.

The pivot arms 54 and 56 are connected to a support member 100 by means of pins 102 and 104. Attached to the support plate 100 are two spreading assemblies 106 and 108, respectively. Each spreading assembly is comprised of a hydraulic cylinder 110, and a movable platform 112. The movable platform 112 is slidingly supported on a support member, as for example in a track (not shown), and is moved by means of a driving arm 114 of the cylinder 110. The drive arm 114 is pivotally connected to a bracket 116 by means of pin 118. As the pivot arms 54 and 56 are rotated in a counterclockwise direction, as was previously discussed, the support member 100 is raised upwardly. In timed relation with the raising of the support member 100, cylinders 110 are actuated causing the drive rods 114 to be moved outwardly which causes the movable platforms 112 to move outwardly away from the center of the roller table 14. As the support member 100 and movable platforms 112 are moved, the exterior bricks will be again picked up first and successively every other brick from the outer end inward will likewise be picked up so that each brick will be moved until positioned as shown in FIG. 5. As was the case with the first exemplary embodiment shown in FIGS. 1 and 2, when the bricks have attained the desired degree of separation, as in FIG. 5, the movement of cylinders 110 is halted and the drive bar 66 is moved outwardly, causing the pivot arms 54 and 56 to move in a clockwise direction, thereby causing the downward movement of the support member 100. As the spreading assemblies 106 and 108 are lowered to their initial starting position, the bricks 10 will be placed back on the rollers 20 with the articles now in a separated condition.

By continuing the above processes with either the first or second exemplary embodiments of the present invention, a great number of rows of bricks can be spread and transferred from a cutting area to an accumulation area in a fast and convenient manner.

It will now be clear that there has been provided a device which accomplishes the objectives heretofore set forth. While the invention has been disclosed in two preferred exemplary forms, it is to be understood that the specific embodiments thereof as described and illustrated herein are not to be considered in a limited sense and that other forms or modifications of the present invention will also come within the scope of the following appended claims.

What is claimed is:

1. A method for spreading apart and spacing a row of abutting brick or brick-like articles comprising the steps of:

feeding a row of abutting brick or brick-like articles in a first direction onto a support table having transverse open spaces extending under said row of articles along a second direction substantially perpendicular to said first direction, providing relative vertical motion between said support table and a transverse transport assembly aligned with said transverse open spaces so as to successively engage individual articles within the row from the exterior toward the interior of the row of articles until successive articles are engaged by the transport assembly and successively transported outwardly thereby so as to space the articles one from another by desired predetermined amounts, and, thereafter, retracting the transport assembly relative to said support table thereby redepositing the row of articles on the support table in a spread apart condition.

2. The method as in claim 1 including the further step of moving the row of articles in a spread apart condition from the support table along said first direction.

3. The method as in claim 2 wherein the spread apart articles are moved from said support table onto a support plate and including the step of further transferring the row of spaced apart articles and the support plate onto a pallet and withdrawing the support plate from beneath the row of articles thereby leaving the spread apart row of articles on the pallet.

4. The method as in claim 3 including the further step of transferring the pallet supporting the row of spaced apart articles onto an accumulator.

5. The method as in claim 1 wherein the support table is a roller table comprising a plurality of rollers having rotation axes substantially parallel to said second direction and the transport assembly is positioned so as to be vertically movable between the rollers in the support table, whereby the step of feeding the row of articles onto the support table further includes the cutting of said articles from a column of extruded clay material by pushing the column laterally through a plurality of vertically extending wire cutters along said first direction.

6. The method as in claim 5 wherein the transport assembly comprises a pair of inclined conveyor assemblies and the step of successively transporting each article includes the step of moving conveyor belts on said conveyor assemblies in opposite directions away from the center of the support table in a timed relationship with the raising thereof.

* * * * *